United States Patent [19]
Roberts et al.

[11] 3,767,302
[45] Oct. 23, 1973

[54] MICROFICHE CAMERA

[75] Inventors: William E. Roberts, Palos Verdes Peninsula; Ronald L. Whitney, San Fernando; Ronald C. Wickenhiser, Van Nuys, all of Calif.

[73] Assignee: Terminal Data Corporation, Van Nuys, Calif.

[22] Filed: Oct. 26, 1972

[21] Appl. No.: 301,012

[52] U.S. Cl. ...................... 355/53, 355/54, 352/82, 352/83
[51] Int. Cl. ...................... G03b 27/42, G03b 27/46
[58] Field of Search ...................... 352/83, 159, 82; 355/54, 53

[56] References Cited
UNITED STATES PATENTS

| | | | |
|---|---|---|---|
| 3,183,806 | 5/1965 | O'Brien | 95/4.5 |
| 3,627,413 | 12/1971 | Bushey | 355/54 |
| 3,558,226 | 1/1971 | Riggs | 355/54 |
| 2,699,702 | 1/1955 | Cuber | 352/159 |
| 2,142,493 | 1/1939 | Carpenter | 352/159 |
| 2,956,493 | 10/1960 | Lauder | 355/91 |
| 2,419,474 | 4/1947 | Wilcox | 95/31 DS |
| 2,099,681 | 11/1937 | Draeger | 95/31 DS |

*Primary Examiner*—John M. Horan
*Attorney*—Harry R. Lubcke

[57] ABSTRACT

A microfiche camera for exposing either relatively wide or narrow film at high speed with minimal inertial or frictional constraints. An objective lens is stationary, as are film path guides. A single pocket encloses a large loop of film prior to longitudinal movement of the film onto an orthogonally movable carriage, and also a small loop of film subsequent to photographic exposure of the film upon the carriage. The film guides are the width of the narrow film, save a wide transverse guide positioned near the entrance of the film onto the carriage. Suitable logic controls the motion of the carriage and the motion of the film thereon according to a desired fiche format. Vacuum adheres the film to a platen during exposure and air pressure separates these for rapid motion between exposures.

16 Claims, 7 Drawing Figures

PATENTED OCT 23 1973 3,767,302

MICROFICHE CAMERA

BACKGROUND OF THE INVENTION

This invention pertains to precision photographic cameras in which a multiplicity of exposures are made on a given section of film by moving the film with respect to the lens between successive exposures.

Certain prior art microfiche cameras have moved an entire strip of film, including the reels and feed mechanisms, according to the fiche format in order to expose the film from a stationary image formed by a stationary lens.

Others have moved the lens in order to move the image in the required fiche format for exposing the film.

In U.S. Pat. No. 3,601,487 that part of the film strip that received the exposing image was fed by spring-tensioned rollers and was orthogonally moved in a carriage that was controlled in position by a rotatable format disk.

SUMMARY OF THE INVENTION

In order to provide a high speed of operation with dynamic motional isolation of the film carriage, as well as simplicity, novel single-pocket stationary film-strip constraints are employed near the carriage. This is a departure from the device of previously mentioned U.S. Pat. No. 3,601,478.

Film is now pulled and pushed from the storage reel to the carriage and it passes in a similar manner through another part of the same pocket before takeup. More specifically, the film is pushed from entrance drive rollers into the upper portion of the pocket. The film drive on the carriage pulls the film from the pocket as required. This film drive also pushes the film into the lower portion of the same pocket, while the takeup drive pulls it from that location.

The cushioned constraints are significantly narrower than the microfiche width film employed. Important to orthogonal dynamics, a transverse guide that is wider than the film, guides it before it enters the carriage. Film-actuated control switches provide a longer loop of the film before it enters the carriage than when it leaves it.

Fiche format control means are arranged along the width of the carriage for the orthogonal control thereof. Additional electronic logic controls the longitudinal motion of the film for the full accomplishment of the fiche format. Further logic inhibits exposures while the film is moving.

Vacuum adhesion of the film to an exposure position platen upon the carriage during exposure and pressure separation therefrom against two low-inertia rollers during the movement of the film allows rapid movement of the film at required accuracy without scratching.

Narrow lateral guides are selectively provided to adapt the camera for 16 mm film, along with a narrow compartment of the vacuum platen.

The above three figures are partially in section, with the section lines indicated in each of the first two.

Figure 4:
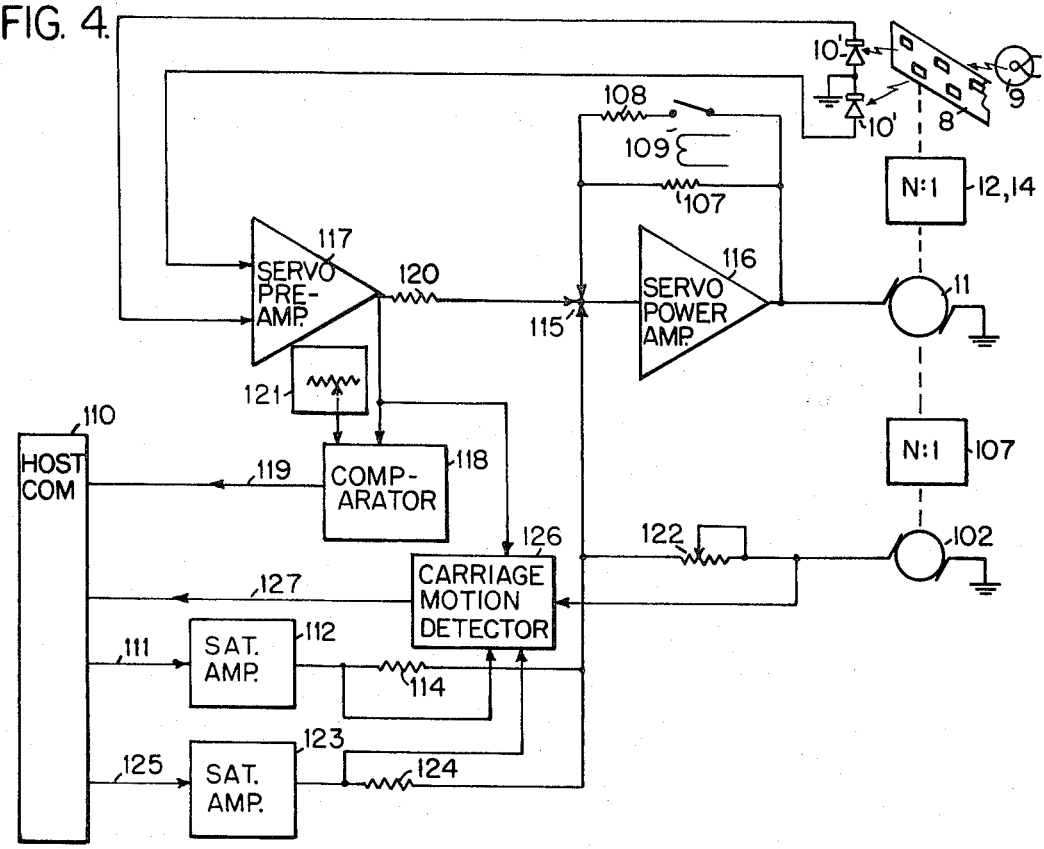

FIG. 4 is a block electrical diagram of the servo loop for the orthogonal motion of the carriage.

Figure 5:
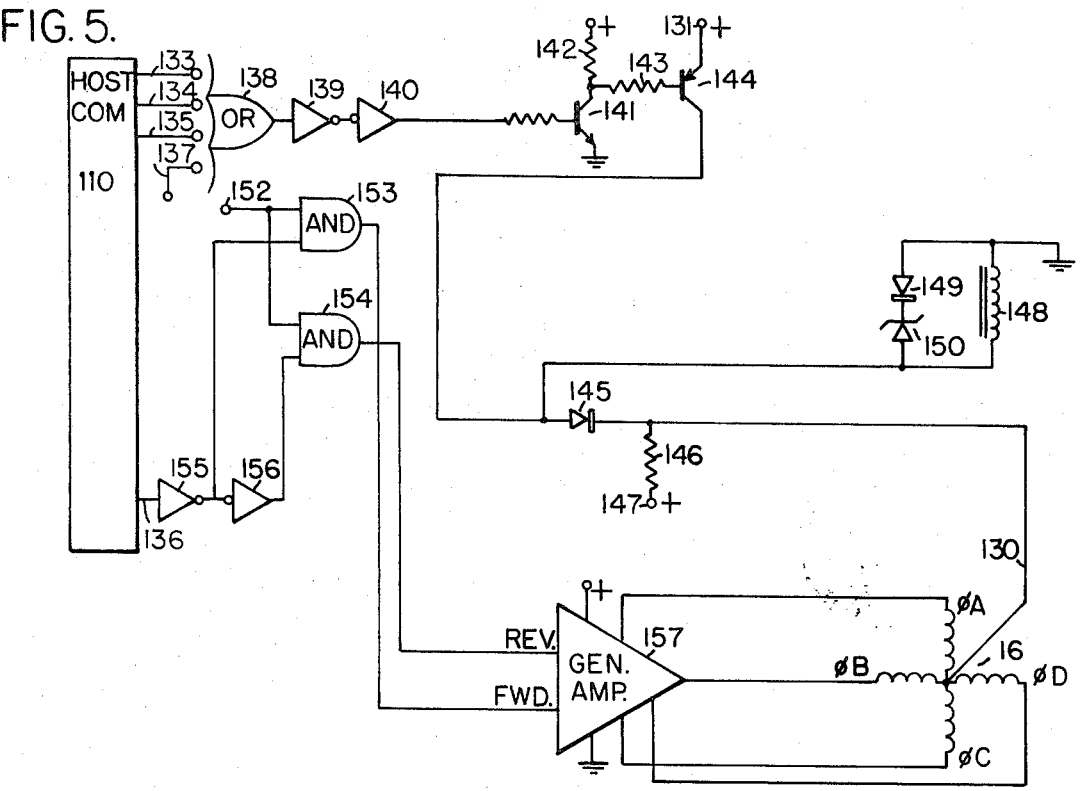

FIG. 5 is a block-schematic diagram of the control circuit for the film pull-down stepper motor.

Figure 6:
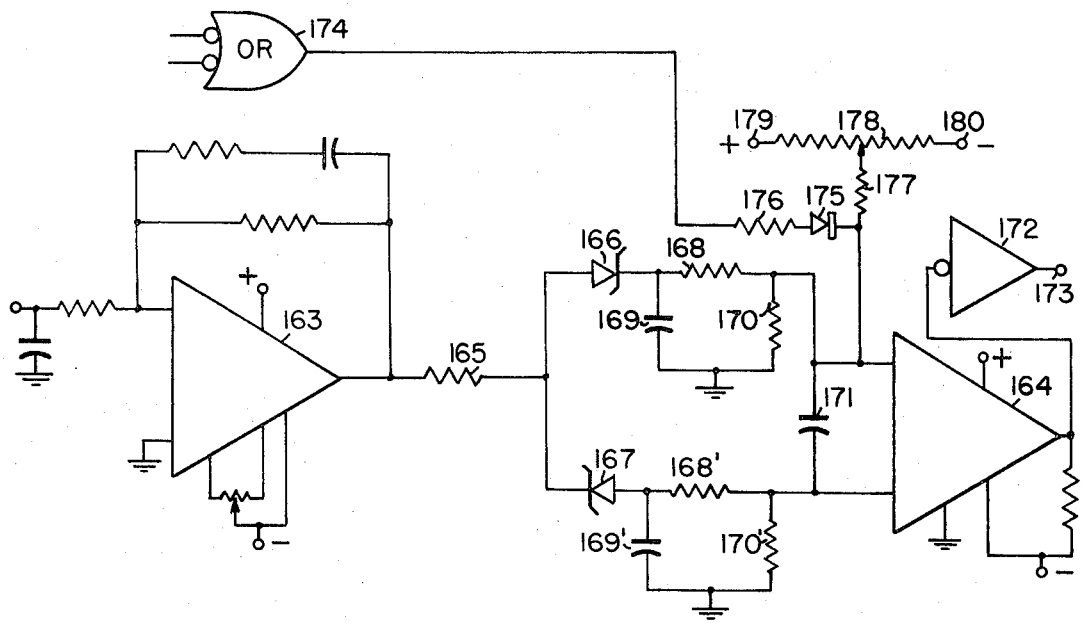

FIG. 6 is the schematic diagram of a carriage-in-motion signal generator.

Figure 7:
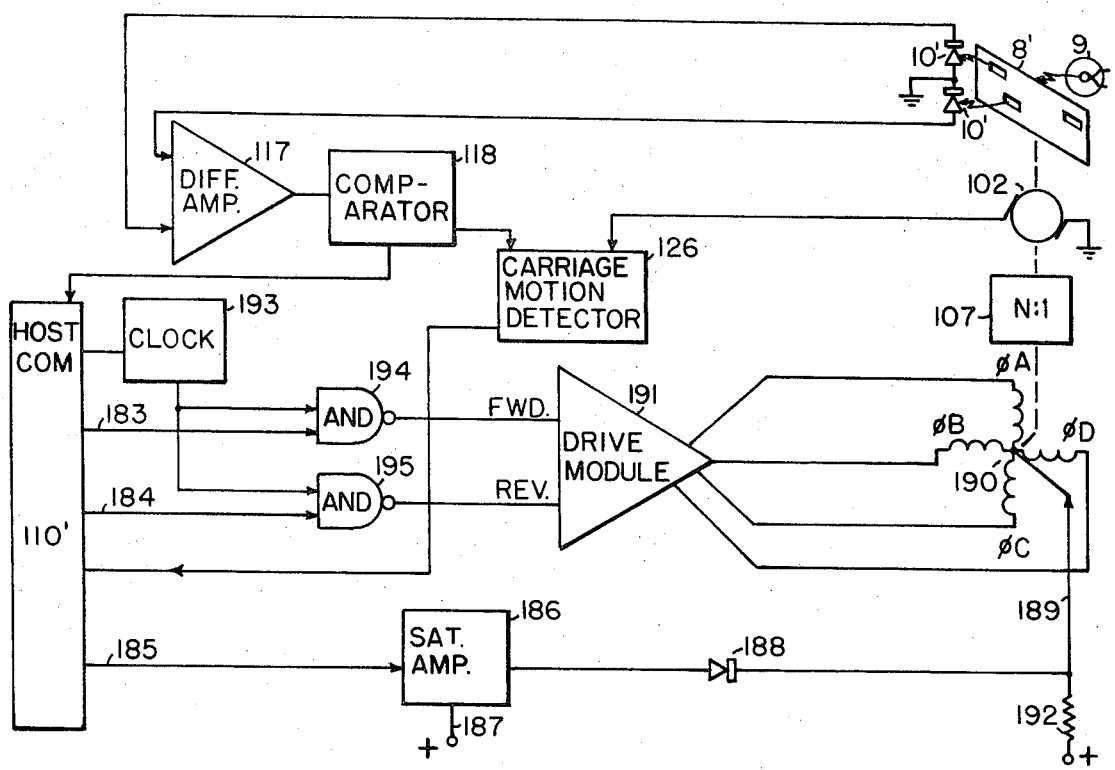

FIG. 7 is a block diagram of an alternate-embodiment circuit for stepper motor actuation of the orthogonal motion of the carriage.

DETAILED DESCRIPTION OF THE INVENTION

Figure 1:
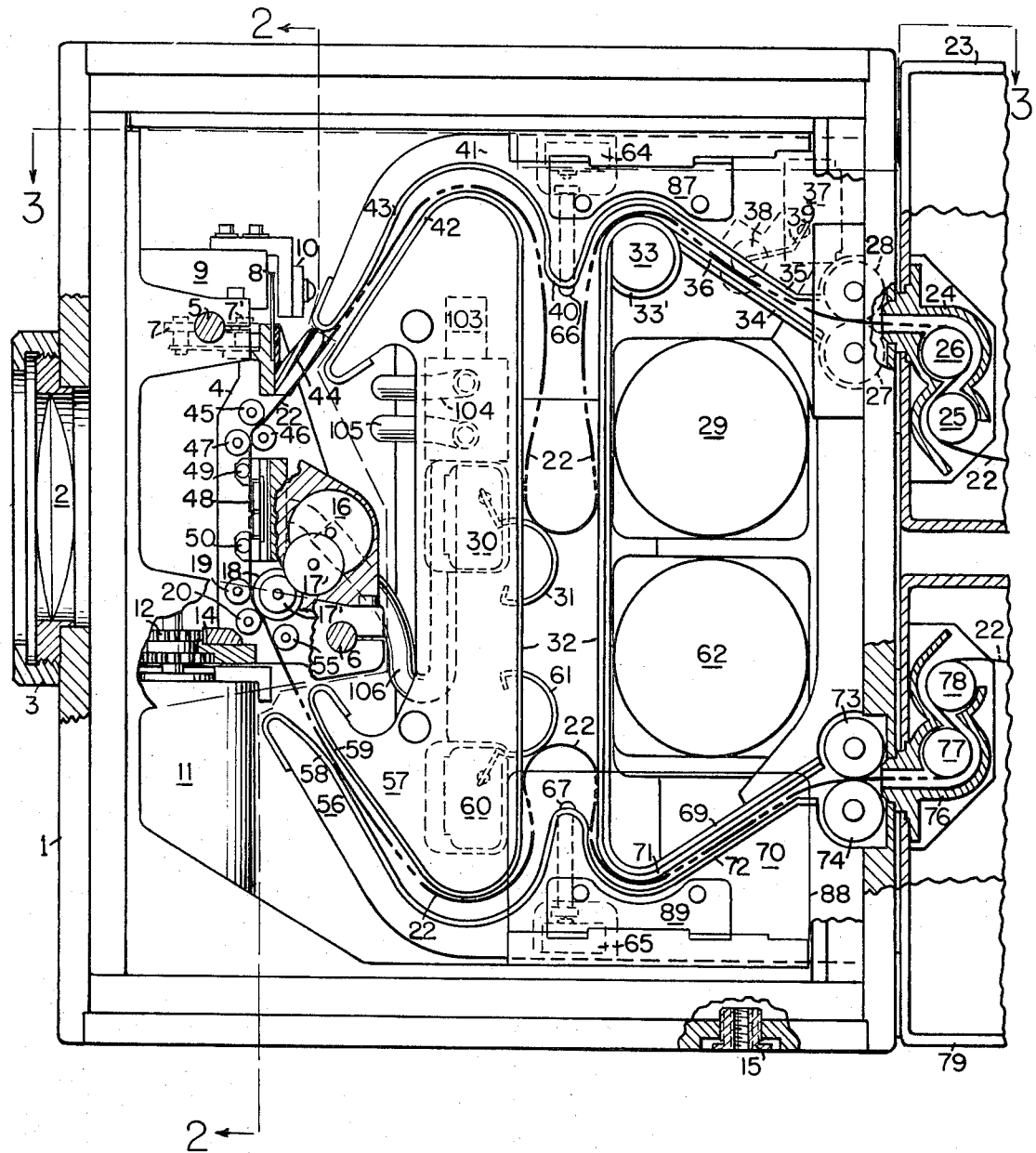
FIG. 1 is a side elevation of the camera, showing the path of the film strip.

In FIG. 1 numeral 1 indicates the outer case of the camera proper. This supports stationary lens 2 in a relatively fixed focus mounting 3. Carriage 4 moves the film orthogonally (horizontally), to provide one direction of motion required to form the fiche, typically the column motion. The carriage is supported by an upper rod 5 and a lower rod 6, which are attached to case 1. Low-friction rotatable means 7, 7', such as ball-bearings having inner and outer races are employed to bear upon upper rod 5 as a pair at the center of the carriage. A pair of ball bushings are similarly fastened to the carriage at the two lower corners, with the balls rotating along lower rod 6.

The carriage also carries linear format control means 8 to accomplish precise positioning of the carriage as a part of an electro-optical-mechanical servo loop. Element 8 is an opaque strip having a pattern of apertures, suited to control both incremental horizontal translation of the carriage and turn-around at the extremes of that travel, in combination with illumination means 9 and photosensitive means 10 and 13. The former is typically a single elongated infrared energy emitting device, such as may be within the camera without exposing the film. The latter may take the form of photovoltaic cells for elements 10 and phototransistors for elements 13. Servo motor 11 is controlled from the outputs of these means through suitable electronic logic to be described later.

In an alternate embodiment a stepper motor 190 replaces servo motor 11, and a simplified format strip 8' controls the same at the ends of the excursions.

A carriage drive pinion gear 12 is attached to the shaft of motor 11 and engages a rack gear 14, which is fastened along the carriage. This drive is made precise by employing a spring-loaded two-piece gear for element 12, or by precisely fitting a single gear to the rack. Typically, the gear is of steel or a plastic such as acetal resin. This is a thermo-plastic polymer, produced by the polymerization of formaldehyde and known as Delrin. The rack is typically of aluminum, to keep the weight of the carriage at a minimum.

Carriage 4 carries a film pull-down motor 16, typically of the stepper type. It is mechanically connected through a gears 17 and 17' to driven metering roller 18, which is provided with upper idler pressure roller 19 and lower idle pressure roller 20. This assembly precisely determines the vertical position of the film and extends the full width of the 105 millimeter film normally used for producing microfiches. This film 22 is shown threaded through the camera in FIG. 1. A line interrupted by a double dash is used for identification.

Unexposed photographic film or its equivalent is contained in supply magazine 23 upon a spool normally furnished by the manufacturer of the film. The spool is held between a rotatable bearing, such as fabricated from acetal resin (Delrin), positioned at the rear center of the magazine, and a non-rotatable bearing in the door.

Film 22 next passes through a passive light trap 24 in the supply magazine; having an enclosing "S" shape cavity in this embodiment, a first roller 25 and a second roller 26. These are free-running rollers. The cavity is effective as a light trap, whether or not the magazine is attached to the camera.

The film then passes between supply drive rollers 27 and 28, the latter being an idler pressure roller. Roller 27 is driven by supply roller drive motor 29, through such means as toothed belt 21, shown in FIG. 3 and acting between toothed pulleys 29' and 27'. Motor 29 is electrically controlled by microswitch 30, typically via solid-state relay 30'. The microswitch has sensor wire loop 31, which is in mechanical contact with the upper, large loop of film 22 within single pocket 32. When the large loop of film is in contact with sensor 31 motor 29 is stopped; when the reverse is true motor 29 operates.

An important element 33, a stationary transverse guide, is in the film path just before the large loop in the film 22 is formed. This coacts with narrow stationary film conduit 34, 35, which accepts the film from supply rollers 27 & 28, to properly feed the film into pocket 32. The film is uniquely pushed upon its way in this portion of the film path. Each surface in contact with the film of the metal or plastic film conduits is covered by a soft resilient material, having a vertical cut pile, such as velvet or plush 36. This prevents scratching the film and reduces the friction to its motion to a minimum. On transverse guide 33 the plush may be in the form of pads 33' at each extremity of the guide. Alternately, a highly polished hard surface, such as chrome, may be used instead of the velvet or plush 36 and 33'.

Conduit 34, 35 is only about one-sixth as wide as the 105 mm fiche film, conveniently being 16 mm wide for conversion of the camera to that width of film as an alternate embodiment. However, transverse guide 33 has a width somewhat in excess of 105 mm. It is employed to provide required dynamic stability to the film in view of the orthogonal motion of carriage 4 to accomplish the full fiche format. Guide 33 prevents the film from twisting excessively at the extremities of the transverse excursions of the carriage. It provides minimum inertial and frictional load on the film carriage, thus almost perfect dynamic isolation between these two major subassemblies of the camera.

There is no spring tension on the film, thus it can move in and out of single pocket 32 as carriage 4 moves orthogonally. The film pushes itself back down into the pocket when the center position is approached by the carriage. The friction is very small.

Prior art cameras used spring-loaded takeup rollers to accommodate the compound film motion required in a moving-carriage embodiment. The pocket construction of this invention has reduced the side-pull on the carriage due to the film to two ounces, which increased the dynamic isolation of the carriage. This has resulted in a corresponding increase in accuracy of the positioning of the fiche frame, to the order of 0.002 inch.

An additional fitment at this part of the film path is "out-of-film" switch 37. By means of actuator roller 38 and arm 39, an absence of film at conduit 34 allows the roller to drop into a slot in the conduit and close the contacts of switch 37.

An upper conduit guide 40, 41 is employed to form the film loop into pocket 32 and also out of the same preparatory to passing onto carriage 4. These surfaces are also covered with plush 42, 43, or equivalent. The shapes shown accomplish a smooth and dynamically proper feed of the film despite the orthogonal and longitudinal back and forth motions required. The former motion is required to accomplish the multiple fiche exposures, with the back and forth motion for the same reason, the row pagination mode of fichegeneration, and for applying title information.

Film 22 enters carriage 4 via carriage inlet film guide 44. As more completely seen in FIG. 2, this nylon or teflon guide extends the whole width of film 22 and has edge-restraining projections to position the film centrally upon the carriage for carriage loading purposes. After the film is threaded through the carriage it does not contact guide 44.

Upon the carriage film 22 next passes through three full-width idler guide rollers 45, 46 & 47. These rollers direct the film over the platen during loading and supports the 105 mm film in position because of spring-loaded edge guide 80.

Film 22 then passes over vacuum platen 48, to be in position to receive the photographic image from lens 2. Idler retaining rollers 49 and 50, respectively above and below the platen proper, contain film 22 from undesired large excursions when it is blown off of the platen by the pressure phase of the operation. During the exposure phase the film is held to the platen by a vacuum.

A particular pattern of slots 52 and holes 53 is employed in the platen for maximum effectiveness. This accomplishes a uniform suction on the film during the vacuum phase and expedited detachment of the film from the platen during the pressure phase. The slots are arranged in a recurrent diamond pattern, with the holes at the top and bottom extremities of each diamond shape and at the central cross-overs of the slots. See FIG. 2.

As has been described, film pull-down motor 16 appropriately pulls down film 22 by means of driven metering roller 18 and accompanying pressure rollers 19 and 20. An additional idler (film guide) roller 55 acts upon the film as it leaves the carriage. Spring-loaded flanges on idler rollers 18 and 46 push the 105 mm film against reference edge 4' of carriage 4. Format strip 8 is referenced against this same edge.

The film then passes into a lower film guide or conduit 56, 57, which is the equivalent of conduit 41, from which it earlier emerged. All of the lower conduit is also lined with plush material, as at 58, 59, corresponding to 42, 43 before.

In the same manner as switch 30 and sensor 31 provided control for supply roller drive motor 29; switch 60; solid state relay 60', and sensor wire loop 61 provide control for take-up roller 73 and drive motor 62.

Sensor 61 is positioned relatively close to the bottom of single pocket 32, as compared with the greater distance from sensor 31 from the top of the pocket. This resulting in a long loop of film 22 at the top or input side of the path and a short loop at the bottom or output side of the path. This configuration allows reversal of direction of motion of a length of film of, say 6 inches for titling the 105 width of fiche film, or for forming the row pagination type of fiche, without pulling film from the take-up magazine, or pushing film back into the supply magazine. Sensors 31 and 61 are electrically disabled during this phase of the operation.

This disablement occurs at the beginning of a titling sequence, after which the six inch length of film is pulled through, shortening the upper loop and lengthening the lower loop. Reversed longitudinal traverse of the film is then accomplished by suitable electrical commands to stepper motor 16, by logic to be later described. This sequence is performed once if a one line title is required and twice if a two line title is required. Thereafter sensors 31 and 61 are reactivated and the loops return to normal.

By employing unequal lengths of film in the normal loops there is obtained some 35 percent more longitudinal traverse of film from the loops than would be obtained if the normal loops were equal.

It is possible to reverse the configuration and have the short loop at the top and the long loop at the bottom. In this case sensors 31 and 61 and the accompanying switches are altered in relative position, both being higher in pocket 32. The sequence of titling is then also reversed, by suitably altering the program of the electronic logic.

In the opposite manner to the loop limit actuators and switches just described, there is also provided two "film tight" sensing switches 64 and 65, having rod actuators 66 and 67, respectively. The latter are mounted at the point of maximum curvature in both the supply and the take-up conduits, such that should the loops of either or both corresponding portions of film 22 be lost the appropriate switch 64 or 65 will activate supply motor 29 and/or deactivate take-up motor 62.

Film 22 continues to follow a path through conduit 69, 70, having plush coverings 71 and 72, respectively, to take-up drive roller 73, which operates in conjunction with take-up idler pressure roller 74. The take-up drive roller is driven from the take-up drive motor in the same way as was set forth with respect to the supply roller and motor.

Film 22 finally passes through light trap 76, of take-up magazine 79, which trap has first roller 77 and second roller 78. The take-up reel within the take-up magazine is gear driven from take-up motor 62, to complete the motional path of the film.

A typical camera mounting boss is shown at 15 in FIG. 1.

Figure 2:
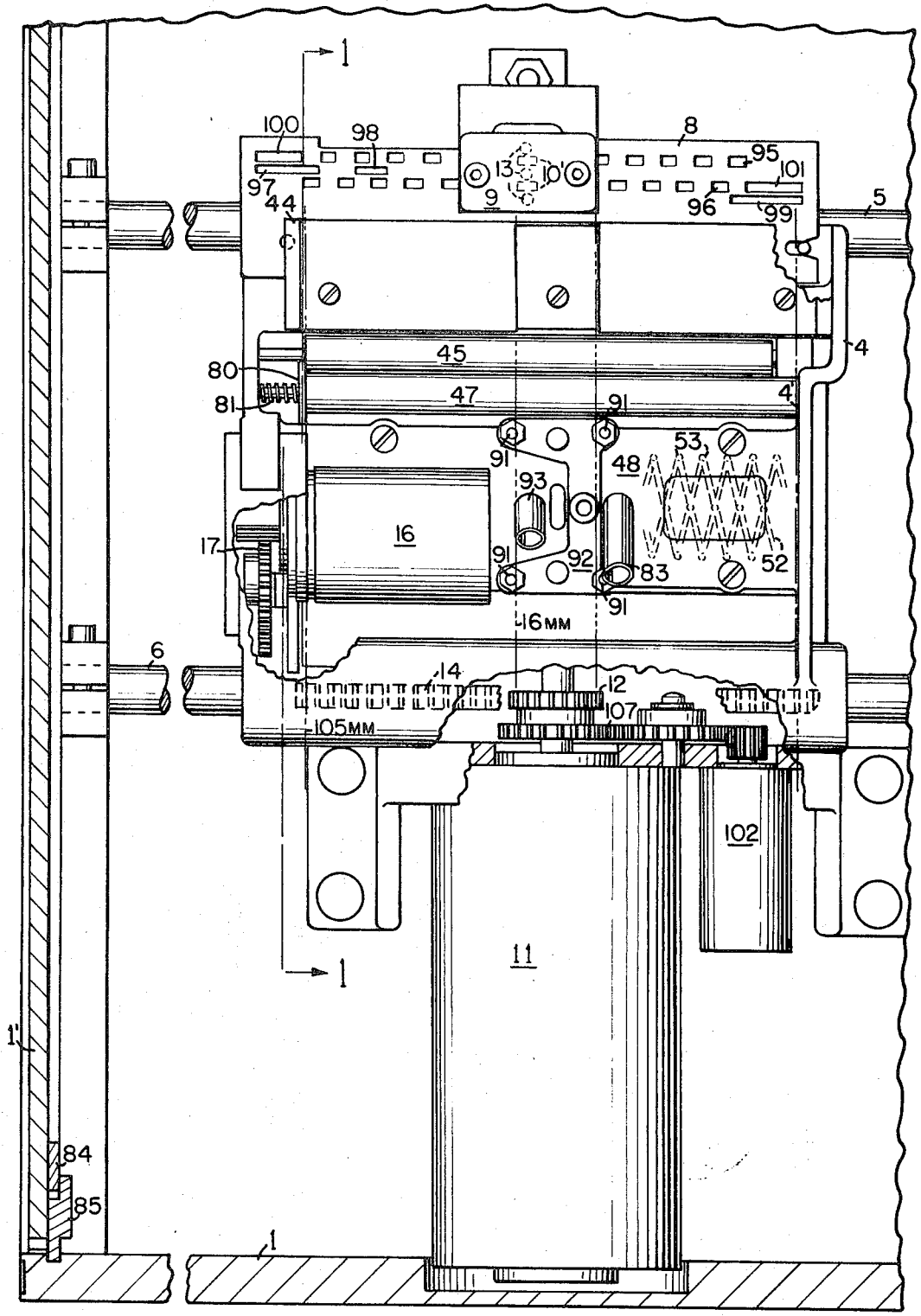
FIG. 2 is a front elevation of the camera, showing the fiche format control means.

Referring more particularly to FIG. 2, spring-loaded film edge guide 80 precisely positions the film orthogonally by exerting pressure on the edge of the film at the left, while the edge structure of the carriage itself, 4', retains the film at the right. Spring 81, centered upon a pin and fastened to the left side of the carriage exerts pressure upon guide 80.

Flexible hose 106 conveys air pressure or a vacuum to platen 48, via port 83 for 105 mm film or port 93 for 16 mm film, from whence the pressure difference is distributed over the platen through the several slots 52 and holes 53 that have been previously described. The preferred air pressure is of the order of 30 inches of water, and the preferred vacuum is of the order of minus 15 inches of water.

Upon the compartmentalized platen, the 16 mm port 93 controls only the center half-inch thereof. Port 83 controls the remainder of the platen. Hose 106 is either manually connected to the appropriate port, or a solenoid-actuated three-way valve (not shown) is employed. Hoses 104 and 105 are the pressure and vacuum supply lines. These extend from solenoid pressure/vacuum valve 103 to the exterior of case 1 for connection to appropriate external sources.

In FIG. 2, the left side 1' of the outer case is an access door to the interior. It has light-seal strips 84 and 85.

While 105 mm wide film is required for conventional microfiche photography, there is a strong demand for 16 mm film photography of documents or equivalent images. Such exposures are normally photographed in succession upon the narrow film, but there is some demand for photographing two frames side by side.

It was previously mentioned that center guides 32, 34, 41, 56, 70, etc. were 16 mm wide. This is sufficiently wide enough to control the 105 mm film as long as transverse guide 33 is employed. By providing supplemental lateral guides that are placed in an operating position when 16 mm film is employed, but which are moved out of the film path when 105 mm film is employed, the camera may be used to expose fiche frames upon 16 mm film as well as upon 105 mm film.

Figure 3:
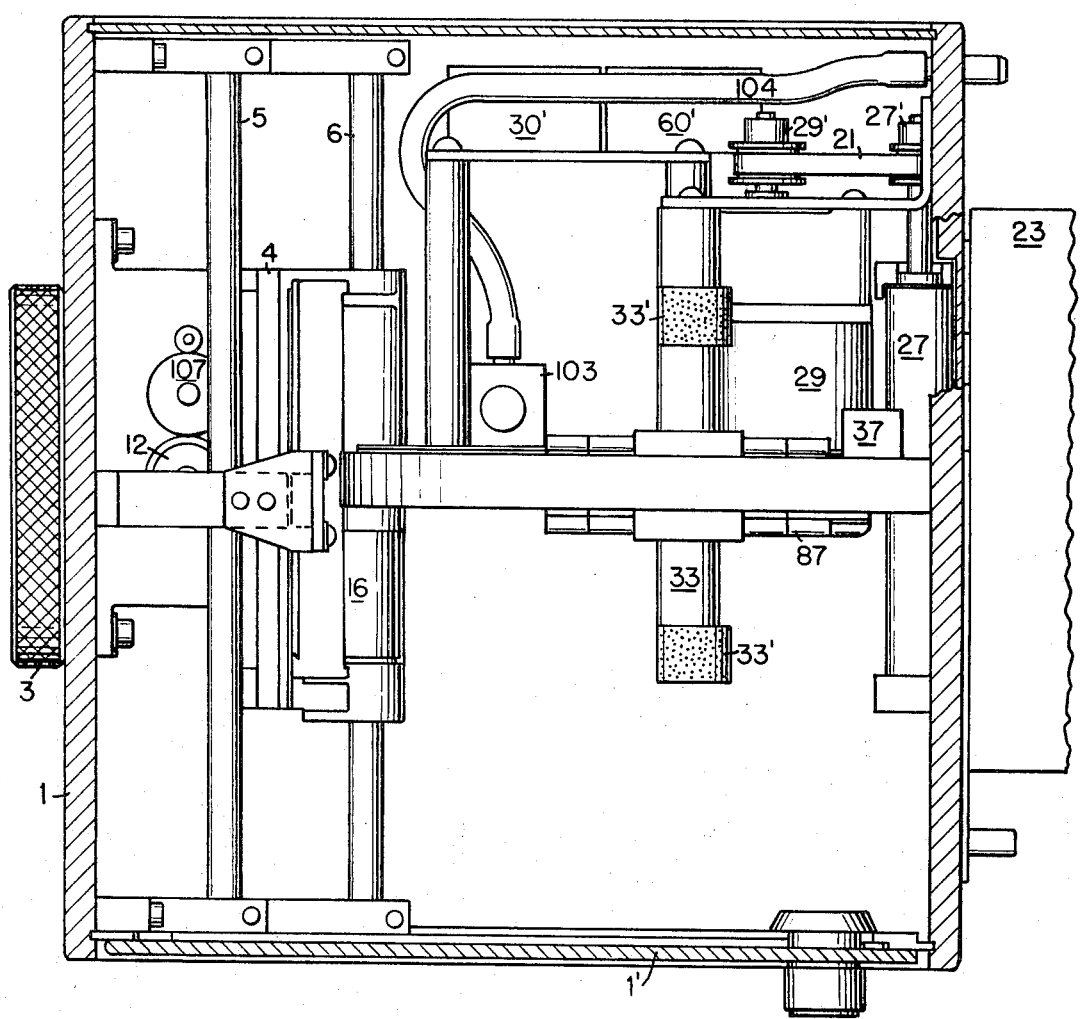
FIG. 3 is a top plan view of the camera.

On the film supply side of the camera, at the top of FIG. 1 and the center of FIG. 3, spring hinge 87 is fastened to the stationary part of the camera. It is shown in the position for using 16 mm film in the camera in FIG. 3 and in the 105 mm position in FIG. 1. At the top of FIG. 1 there is also shown a second mating plate in the 16 mm option position. An additional pair of plate guides are shown in the 16 mm operation position at the bottom of FIG. 1 at 88, being fastened to a spring hinge 89. It is seen that the lower plate, for instance, extends over part of the left-hand film conduit 57, over part of pocket 32, and over most of right-hand film conduit 70. The spring hinge insures that the plate will lay against the sides of these conduits when in use, and will be out of the film path when manually rotated 100°. These plates are provided on both sides of the film path during the 16 mm mode of operation.

In FIG. 2 the 16 mm film is guided on platen 48 by four pins 91 upon carrier 92. A separate pressure/vacuum hose fitting 93 is also provided for 16 mm operation, as has been described. The pins and the carrier are removed from the platen for the 105 mm mode of operation by retracting carrier 92 away therefrom and to a position in which it is retained by a mechanical detent.

In exposing 16 mm film with a single row of fiche frames the orthogonal excursions of carriage 4 are inhibited and only longitudinal pull-down motion of the film occurs. Titling is not required on this linear format. For fiche frames side by side on 16 mm film a limited orthogonal motion occurs, to be later described.

Returning now to the use of 105 mm film and orthogonal control of the carriage, linear format strip 8 constitutes the source of such control. Typically, an opaque strip 8 having a pattern of apertures controls the generation of electrical signals in coaction with a source of illumination and plural photosensitive devices.

In the embodiment illustrated in FIGS. 1 and 2, an illuminator module 9 is centrally positioned with respect to the central position of the carriage on the forward side of format strip 8, while a photocell sensor module 10 is positioned on the opposite side of the strip and is aligned with the illuminator. Module 10 contains five separate photo sensors of two kinds designated as 10' and 13. Module 9 contains a single light source, preferably infrared, so that a photo sensor is illuminated whenever an aperture in strip 8 is aligned with the illuminator. A single illuminator is required to eliminate effects of the emitter thereof aging.

The two rows of staggered rectangles 95, 96 are used to determine multiple stopping positions for the orthogonal motion of the carriage. The locations of the overlaps of these holes determines where the fiche columns are located. Typically, a positive polarity signal is generated by logic connected to the upper photo voltaic rectangular cell 10', and an equal but opposite negative polarity signal is generated by logic connected to the lower photo voltaic rectangular cell 10'; that is, when carriage 4 is in a position such that equal illumination passes through adjacent pairs of apertures 95, 96. This null position stops servo motor 11.

The remaining elements 13, round, are phototransistors. Coactive with other apertures in strip 8, they give "on" or "off" indications to detect the carriage being at midpoint of orthogonal travel, a first fiche row "home" position and the last fiche row "Nth" position.

It will be noted that most of the left side at the top of format strip 8 is of reduced height with respect to that at the right. This difference occurs at the exact center of the strip-carriage and a signal is generated at this mid-position by upper phototransistor 13. This signal is used during the retrace excursion of the carriage for appropriate logic control of the return velocity.

Aperture 98, at the left in FIG. 2 and vertically positioned between the two rows of staggered rectangles originates a signal to inform the logic that the carriage is at the "home" position, which corresponds to the first fiche column. This "home" signal is given somewhat in advance of the actual home position, as an advance signal in the retrace of the carriage. Similarly, aperture 97, farther to the left, is the home position for the titling excursion of the carriage. These apertures coact with the center phototransistor means 13.

The lower aperture 99 on the right-hand side of the format strip in FIG. 2 produces a signal in coaction with the lower phototransistor means 13, to inform the logic that carriage 4 is at the "$N^{th}$", or last, column of a fiche.

A carriage velocity sensor 102, an electric generator is driven from servo motor 11, by gear train 107, having typically, a 2.7 to one speed increase ratio, and generating a voltage output proportional to the orthogonal velocity of the carriage. Alternately, the gear train 107 may be driven from carriage rack gear 14. The voltage output provides an input to the servo control logic.

Elongated slots 100 and 101 are the first and last slots, respectively, of the two rows of staggered rectangles 95 and 96. These are elongated to assure a servo signal when the carriage overshoots in position in either direction. Were only short rectangles employed at the ends the format strip would present an all-opaque configuration and the operation of the servo system would be indefinite and confused.

The electronic and logic circuits required to form the servo system for the orthogonal drive of carriage 4 are given in FIG. 4.

In order to position film 22 for the exposure of successive frames of the fiche in a given column, carriage 4 must be orthogonally moved from one exposure position to the next.

A digital command to initiate this movement typically originates in a host computer-output-microfilmer 110 ("HOST COM"). This is a computer output device from which a "move" command pulse is delivered when the previous exposure has been completed and any other mode requirements of the system have been met. This command is conveyed from output 111 to saturating amplifier 112. This is a known type of amplifier, giving a uniform maximum amplitude output for any input over a threshold amplitude input signal and a zero output for any input less than the threshold level.

The output of amplifier 112, a positive pulse of the order of 12 volts, passes through summing resistor 114 to summing junction 115. This signal overcomes any other signal that may be present at junction 115 and energizes servo power amplifier 116, which may be an RCA type 61600. In this condition motor 11 is accelerated at essentially a maximum rate. The motor is of the servo type, such as an Electrocraft E540.

The drive signal is terminated by a negative output from servo preamplifier 117, which may be a Fairchild U6E 7741 393. This output is applied to comparator amplifier 118. This may be a Fairchild U6E 7710 393. It generates a logic signal that is conveyed to HOST COM 110 via conductor 119.

The input signal to preamplifier 117 originates with the assembly associated with format strip 8.

Illumination means 9, preferably infrared-emitting so as to have no photographic exposure effect upon fiche film 22, simultaneously illuminates the whole operative vertical extent of the format strip. Considering the servo staggered rectangular apertures 95, 96 therein and the relation to upper and lower photo diodes 10', which function with the upper and lower rows of apertures, respectively, and the series connection of the diodes shown in FIG. 4; as the format strip moves orthogonally a sinusoidal electrical output is produced, having one complete cycle when the distance from one fiche frame to the next in a column has been traversed.

Preamplifier 117 decreases the level of this signal to approximately 6 volts negative, so that through resistor 120 this signal has proper significance at summing junction 115.

Of equal significance is the output of preamplifier 117 that enters comparator amplifier 118. The other input to comparator 118 is from reference element 121. This is merely a d.c. potential that can be adjusted for proper operation of the system. As the amplitude of the sine wave increases positively with the translation of carriage 4 the output of the comparator switches rapidly from ground potential to a positive pulse of a given amplitude. This occurs at the time that the carriage is approximately half-way between the stopping positions for adjacent fiche frames. The comparator output at 119 is conveyed to HOST COM 110 and causes this entity to terminate the previously effective saturated drive signal, thus to end the acceleration phase of the motion.

The summed negative outputs of servo preamplifier 117 and tachometer 102 then become controlling in decelerating servo motor 11, since this is of opposite polarity to the prior accelerating electrical energy. The tachometer output is proportional to the speed of orthogonal traverse of the carriage. This output is summed at point 115 through resistor 122, which is made adjustable for carriage damping performance purposes.

The output from saturating amplifier 112 is positive in polarity and causes carriage 4 to advance. A second saturating amplifier 123 provides an output of negative polarity. This causes motor 11 to revolve in the opposite direction and so to retrace carriage 4. An actuating command from HOST COM 110 reaches retrace saturating amplifier via conductor 125. Resistor 124 accomplishes summing for amplifier 123 in the same manner as resistor 114 does for amplifier 112.

Carriage motion detector 126 is also a part of the overall servo system. The circuit thereof is detailed in FIG. 6. In FIG. 4, inputs are provided from servo preamplifier 117, which provides a signal as long as there is an unbalance between the illumination upon the upper and lower photo voltaic diodes 10'; and directly from tachometer 102, which gives a voltage output as long as the carriage is in motion. Inputs are also provided from advance drive saturating amplifier 112 and from retrace drive saturating amplifier 123.

An output from the carriage motion detector, elicited by a signal upon any of the inputs, is conveyed to HOST COM 110 via conductor 127. There it inhibits any signal therefrom that would command a photographic exposure to be made. If such were made it would be blurred, of course, because of the motion of the carriage. The use of this detector makes it possible to increase the speed of operation of the camera, since time-safe fixed intervals for inhibiting exposures are not employed.

The circuit of a safety relay 109 is also summed into summing point 115. The relay coil is connected to microswitches such as 64 and 65, so that if film 22 should jam the relay contact would close. Also, a switch associated with door 1' causes the same action if the door is opened. Resistor 107 is the feedback resistor for servo power amplifier 116 and has a resistance of the order of 220,000 ohms. Resistor 108 is connected in series with the contact of the relay and the combination shunts feedback resistor 107, which, in turn, shunts amplifier 116. Resistor 108 has a low resistance value, of a few thousand ohms, and when it is connected across the amplifier the gain thereof is reduced to less than one. This prevents servo motor 11 from operating, regardless of any other commands. Accordingly, the motor is not overloaded by a film jam condition, nor will it function unless the camera is lighttight.

FIG. 5 is a block-schematic diagram of the control circuit for pull-down stepper motor 16. This mechanism causes film 22 to be advanced from supply to take-up magazines, with incremental movements to accomplish exposure of rows according to the fiche format, and, alternately, to accomplish titling of the fiche.

Motor 16 typically has four quadrature windings spaced 90° apart. These are driven by properly sequenced current pulses of power level. In FIG. 5 the common winding connection 130 carries an operating potential, say of plus 29 volts, that is constantly applied from external connection 131. By sequentially grounding the remaining terminal of each field winding, armature rotation is achieved, as by 7.5° increments.

A known procedure of sequentially energizing two adjacent windings; as phases A and B, then B and C, etc. is preferably employed to obtain increased torque and higher operating speeds. Each 7.5° rotation step produces a 0.1 inch (0.25 mm) film displacement with the gear train 17, 17' shown in FIG. 2.

In an overview of the operation of the circuit of FIG. 5, stepper motor 16 accepts drive pulses from a clock generator, which is gated by a command signal from the HOST COM. The clock pulses then enter a ring counter, which includes a loop of four registers. Some of these registers contain a count. The clock pulse train causes the count to go from one register to the next. Each clock pulse causes the adjacent count in the ring counter to advance one register and the motor flux to rotate one 7.5° increment.

In FIG. 5, HOST COM 110 is the same device previously shown in FIG. 4. With respect to FIG. 5 it originates commands for the control of longitudinal film pull-down stepper motor 16 in the following manner.

Upon conductor 133 the command to advance one column pitch is carried. This causes film 22 to be moved longitudinally a sufficient number of incremental steps to enable exposures to be made in the next column. Conductor 134 carries the command to advance film 22 enough to provide a margin between one whole fiche and the next, to allow the developed film to subsequently be cut into separate cards. Conductor 135 carries the command to "complete the fiche." This is to disregard what would normally be the next fiche frame position and to move film 22 to the position to start the next whole new fiche. This command makes it possible to cease exposing frames on a given fiche, as occurs when the end of a number of pages of original copy has been reached, and it is desired to start a new fiche for a new subject, chapter of a book, etc. Conductor 136 carries a "reverse" command. This causes film 22 to be reeled backward one column in the fiche format. This allows exposure of a fiche frame position that was previously unexposed, or to blank out by overexposure a fiche frame that was exposed with text that it is now desired to eliminate.

Conductor 137 carries the command to feed film 22. This is manually executed, typically by actuating switch means within case 1 of the camera. It is superior to other commands during the threading operation, when a new roll of film has been placed in the camera and it is to be advanced out of the supply magazine 23 and through the film path to the take-up magazine.

Conductors 133, 134, 135 and 137 are connected as inputs to OR gate 138. Thus, an input from any one of them will give an output from the gate. This output is amplified by inverting amplifiers 139 and 140 in tandem, and is then impressed upon the base of NPN transistor 141. The emitter thereof is connected to ground and the collector to an energizing source of voltage of positive polarity, such as +29 volts, through resistor 142, of 5,000 ohms. The collector is also connected through another resistor 143, of 1,000 ohms, to the base of PNP transistor 144. This transistor has an emitter connected directed to terminal 131, which signifies a +29 volt power source, and a collector connected to the anode of diode 145. The cathode of the diode passes directly to common connection 130 of stepper motor 16.

When motor 16 is to step, any of the inputs to OR gate 138 gives full conduction through transistor 144 and the common connection 130 of the motor is directly connected, in effect, to the power supply at terminal 131. The voltage drop through forward-biased diode 145 is small.

When motor 16 is not to step, but to be only partially energized to hold its position, transistor 144 does not conduct. An auxiliary path for energizing the motor is through resistor 146, typically of 33 ohms resistance, from a duplicate power supply terminal 147, also of +29 volts. This produces a holding torque that is approximately one-fourth the motor starting torque. Heating of the motor is thereby reduced, but film 22 is held in the position assumed by the last motion despite forces as caused by the vacuum or the air pressure used on the platen to position the film upon the carriage.

Solenoid 148 of the vacuum-pressure valve is also connected to the collector of transistor 144. When motor 16 is moving, film 22 is to be detached from the platen 48. Thus, the solenoid is energized through transistor 144 at the same time as the motor is energized, to cause the source of vacuum to platen 48 to be closed-off and the source of air pressure to be connected to the platen. The time constants of the solenoid and the motor windings are arranged so that the pressure is applied approximately 5 milliseconds before the motor starts to move. This properly frees film 22.

Diode 149 and Zener Diode 150 are connected in opposed polarity across solenoid 148, with the anode of the diode connected to the ground side of the solenoid. This circuit is to increase the decay time of the magnetic field of the solenoid so that transistor 144 is protected from the overshoot transient developed by the cessation of current in such an inductor. This back emf is shunted through diode 149 after Zener diode 150 becomes conductive in the Zener mode, at a selected voltage of the order of 30 volts.

A known clock pulse generator provides an input at terminal 152. The repetition frequency thereof is preferably 700 hertz when 150 mm wide film is used in the camera and 1,400 hertz when 16 mm wide film is used in the camera. This input is connected to one of the inputs of each of AND gates 153 and 154. The second input of forward gate 153 receives an inverted polarity of reverse command from inverting amplifier 155.

The second input of reverse gate 154 receives a non-inverted polarity of reverse command from a second inverting amplifier 156. Amplifiers 155 and 156 provide isolation for gates 153 and 154 in the common operative connection to the output at conductor 136.

The operation of either forward or reverse direction of rotation of motor 16 in relation to the command signal at conductor 136 is as follows. When the signal at 136 is "low," i.e., at ground level, the command is actually for forward rotation because of the polarity inversion of the signal by amplifier 155 and the positive or "true" signal given to forward gate 153. When the signal at 136 is "high", i.e., "true", the command is for backward rotation because of the double-inverting action of both amplifiers 155 and 156 and the positive or "true" signal given to reverse gate 154.

When neither direction of rotation is desired the clock pulses are not provided at terminal 152, by control exercised by the HOST COM. Gates 153 and 154 are of the AND type and must have clock pulses and a "true," or positive signal present at the dual inputs or there will not be an output from them.

Output connections from these gates are made to the respective "fwd", forward, and "rev", reverse, input terminals of generic motor-drive amplifier 157. This amplifier includes a four bit ring counter, with four registers. The number four is determined by the four coils shown for stepper motor 16. Between the registers and the four windings, $\phi$'s A, B, C, D of the motor there are interposed four amplifiers, typically employing NPN power transistors.

Upon application of power two adjacent registers are set, causing two adjacent stepper motor windings to be energized. When a film pull-down command is generated in the HOST COM, a predetermined number of clock pulses are applied to the ring counter. Since each clock pulse causes the adjacent count in the ring counter to advance one register, the flux vector of the motor is rotated one 7.5° increment.

The shift register ring counter within generic amplifier 157 also shifts the count backward when the clock signal is gated through to the "rev" terminal thereof, since known steering diodes are included in the circuit of this amplifier. Such operation causes film 22 to flow toward supply magazine 23, rather than from it, which is normal.

Solenoid air pressure - vacuum control valve 103 is constructed having light-weight moving parts so that high speed actuation is possible, as in 5 milliseconds or less.

It is mounted upon a stationary part of the camera, behind carriage 4. It has incoming vacuum line 104 and incoming air pressure supply line 105. The outgoing either vacuum or pressure line is 106. This line is relatively long and flexible, so that orthogonal motion of the carriage is not impeded.

The schematic circuit of carriage motion detector 126 of FIG. 4 is shown in FIG. 6.

When carriage 4 is in orthogonal, transverse, motion along rods 5 and 6, tachometer 102 generates a voltage; negative for the forward direction of motion and positive for the retrace.

This voltage is applied to the input of amplifier 163, which amplifies and inverts it. This amplifier may be of the operational integrated-circuit type 741. This signal is applied to the two inputs of amplifier 164, which may be a comparator differential type 710, through two limiting networks.

The output of amplifier 163 passes through an isolation resistor 165, of a low resistance value such as 470 ohms, and then branches to two oppositely poled Zener diodes 166 and 167. These may each be of the IN3898 type, having a breakdown voltage of 1.5 volts. Each is followed by a low pass filter, which may be composed of a series resistor 168, having a resistance of the order of 100,000 ohms, an input shunt capacitor 169 to ground, of 0.05 microfarads capacitance, and an output shunt resistor 170, of 5,000 ohms resistance. These are the elements following upper diode 166; those following the lower diode 167 have the same numbers, but with prime marks added. A small capacitor 171, having a capacitance of 700 picofarads, is connected between the outputs of the two filters and thus also across the two inputs of amplifier 164.

If the motion of carriage 4 is in the direction that a negative voltage is generated by the tachometer then the output of amplifier 163 is positive. This forward biases diode 166, since the anode thereof is connected to the output of the amplifier. Using a 5 volt output from amplifier 163 as typical, the input to the top terminal of the input to amplifier 164 is approximately plus 4.4 volts (allowing for the voltage drop in diode 166). The same positive voltage is applied to lower Zener diode 167, but because the cathode thereof is connected to the output of the amplifier it operates in the Zener, or breakdown, mode. The voltage drop in the diode is greater in this mode than for the forward biased mode, giving an input to the bottom input terminal of amplifier 164 of approximately plus 3.5 volts.

The input to the top terminal is thus more positive than the input to the bottom terminal. This results in a negative output from amplifier 164, which is inverted to a positive output by simple amplifier 172, of the SN 7406 type. This gives a "true" signal at output terminal 173, that is, "the carriage is moving." This signal is employed to inhibit other commands, such as to expose a fiche frame, since a blurred image would result.

Conversely, if the carriage motion is in the direction that a positive voltage is generated by the tachometer, the output of amplifier 163 is negative. This forward biases diode 167 instead of diode 166, the latter breaking down as a Zener diode. Typically, the input to the top input terminal of amplifier 164 is minus 3.5 volts (because of the Zener voltage drop) and the input to the bottom input terminal of amplifier 164 is minus 4.6 volts. This results in the upper terminal still being more positive, and so a "carriage moving" signal is still provided at the output of amplifier 172.

OR gate 174 provides OR type connection of saturating amplifiers 112 or 123 (see FIG. 4) to the carriage motion detector. These amplifiers are in the circuits that direct servo motor 11 to move. Connection is taken from the complement side of these amplifiers; when the output thereof goes to ground potential, that of OR gate 174 is forced "true," or to a positive potential. This also brings the upper input to amplifier 164 to a positive potential and so gives a "carriage moving" signal from this whole device at regular terminal 173, as has been explained. This would be in addition to such an indication because of an output from amplifier 163.

Diode 175 is connected in the output circuit of gate 174 to allow the output therefrom to pass, but to block any possible back-flow of current from the network that terminates in resistor 170. It should be noted that the output from that network and the output from gate 174 together constitute a further OR gate at the common connection of the two at the upper input terminal to amplifier 164.

Resistor 176, of typically 10,000 ohms, in the output lead from gate 174 and resistor 177, of 47,000 ohms, allow a summing junction to exist at the common connection of the upper input terminal to amplifier 164. Resistor 177 is connected to the adjustable tap on resistor 178, which has a total resistance of 120,000 ohms and extends from positive terminal 179 to negative terminal 180. Typical voltages for these terminals are plus 12 and minus 12 volts, respectively. This network allows the offset voltage at the upper terminal of amplifier 164 to be adjusted to zero.

Instead of the previously described servo motor drive for the orthogonal motion of carriage 4, a stepper motor may be employed, which is applicable for digital clock control.

The required logic is shown in FIG. 7. This apparatus is substituted for that shown in FIG. 4. The apparatus coacting with format control means 8, now identified as 8', because of having only two apertures to indicate the "home" position and a third aperture to indicate the Nth position of the carriage, is otherwise largely the same as before. That is, illuminator 9, photovoltaic cells 10', differential preamplifier 117 and comparator 118, are as before. Carriage motion detector 126 and tachometer 102 are also the same as before, as in FIG. 4. HOST COM 110' is essentially the same as before. The third aperture coacts with a phototransistor 13, as was described in connection with FIG. 2.

In FIG. 7, HOST COM 110' generates, at appropriate times, a forward command by an output on conductor 183, a reverse command on 184, and a carriage motion command on 185.

Conductor 185 is connected to the input of saturating amplifier 186, which is also supplied with electric power at a voltage of, say, plus 29 volts at conductor 187. The output passes to the anode of diode 188 and through the diode to common connection 189 of the windings of orthogonal stepper motor 190. This is shown as a four-winding motor, which is typical, having windings $\phi$A, B, C & D.

When the carriage motion command is "true"; i.e., present, to key amplifier 186 "on", essentially the full voltage at conductor 187 is impressed upon conductor 189, since the amplifier is of the saturating type and diode 188 is forward biased. Motor 190 is thus enabled to execute the commands from drive module 191 at full power.

When the carriage motion command is not present there is no voltage output from amplifier 186 and thus no conduction through diode 188. A second source of electric power of plus 29 volts is connected to current-limiting resistor 192, which may have a resistance of 33 ohms, and therethrough to common conductor 189. This provides a holding current of about half the motion value, to supply adequate holding torque and to reduce heating of the stepper motor.

Known clock 193 produces clock pulses when keyed on from the HOST COM, at a frequency of the order of 2,000 hertz, and is connected to one input of each of AND gates 194 and 195. A command from the HOST COM on conductor 183, which conductor is the second input to AND gate 194, enables that gate to give an inverted output to the forward input to drive module 191. This module is the same type as module 157, previously described in connection with FIG. 5. It provides sequential grounding of typically a pair of windings $\phi$A, B, C & D of motor 190, thus allowing full drive current to flow through these windings.

In an analogous manner, the connections and the apparatus functioning upon a command being present on conductor 184 to gate 195, and an output to the reverse input of drive module 191 results in stepper motor 190 being rotated in the reverse direction, as for returning carriage 4 to home position.

Motor 190 is stationary within the camera, taking the place of motor 11 in FIG. 2, as is tachometer 102, and a speed-increasing gear train 107 is used to drive the tachometer in each instance.

In the application according to FIG. 7, the HOST COM counts the number of clock pulses that are applied to drive module 191 and termin-ates the forward or reverse command signal at 183 or 184 when the desired number of counts have been executed. Motor 190 rotates a fixed segment of a revolution for each pulse, usually 2½° or 1½°. Thus, by knowing how many pulses have been applied the movement of the carriage is also known. The motor is run in this manner until a column of fiche frames is completed. It is at this point that format control means 8' provides an output, indicating that the carriage is at the Nth, or extreme transverse position.

The next command from the HOST COM is to retrace the carriage. This is accomplished via conductor 184, as has been described. It is possible to frequency-modulate the clock during this period and thereby to increase the speed of return of the carriage. The start of the retrace is accomplished at a relatively low pulse repetition rate, which is increased substantially linearly with time to accelerate the carriage until the midpoint of the return is reached. Then the rate is decreased as a function of time until the carriage is at the "home", or fully returned position.

The system of FIG. 7 is an open loop one. The adjacent rectangular apertures at the left side of format control means 8' initially indicate that the carriage is near the home position, and then at balance, that the carriage is precisely at the home position. This position is used in the HOST COM logic as the reference for counting pulses in the next fiche frame exposing traverse. If it is desired to change the fiche format, or to insert titling, a different format control means 8' is installed.

It is possible to operate the microfiche camera of this invention without the control of HOST COM 110. This is accomplished by supplying a clock signal generator, indicated at 152 in FIG. 5 and at 193 in FIG. 7 if a stepper orthogonal motor is used, as a piece of apparatus supplying these timed pulses to the camera and typically mounted within it. Manually operated control panel switches are also provided to generate forward, reverse, or carry motion signals instead of the COM. These signals are typically generated by the switches mentioned in conjunction with a voltage source to give electric signals of either one voltage level or another. Simple relays or logic may also be included to provide a program for generating a fiche, once an enabling command button has been actuated.

In operation, an operator would place a page to be photographed in the photographing position with respect to lens 2 of the camera and then press a button to make an exposure. This would typically be accomplished by opening a shutter provided with the camera, or by flashing a strobe lamp to illuminate the page. Immediately thereafter logic generates a command for carriage 4 to move, the clock signal is gated through by gate 194 of FIG. 7, for example, into drive module 191 to actuate stepper motor 190. The clock pulses are counted in a counter, and when the counter is full the clock signal drive is terminated. The carriage is then in position for exposing the next fiche frame. The operator puts the next page in place, presses the exposure button again, and the process is repeated.

A row-advance pushbutton switch is also provided to move the film forward longitudinally after the Nth frame has been exposed and the carriage must be moved back to the home position. Alternately, logic may be included to execute this motion after the Nth frame has been exposed without the operator pressing any other button.

In FIG. 7, for using 16 mm film with one microfiche frame across the film, the format control means 8' shown is suitable. When it is desired to place two microfiche frames side by side on 16 mm film, an additional pair of rectangular apertures may be provided at half distance along the format control strip. This gives two home positions, corresponding to the two fiche frames to be exposed. It is possible; however, to arrange exposure of the two frames by clock pulse-counting control logic and to retain only the one pair of home position apertures.

For this two-frame embodiment the upper and lower supplemental lateral film guide assemblies 87; 88, 89 previously referred to, are moved farther away from carriage 4 than for the single frame embodiment.

For digital counting control of the servo motor system shown in FIG. 4, the apertures on format strip 8 are greatly increased in number, and have a width of only of the order of 0.004", being spaced on 0.008"centers, top to bottom rows.

HOST COM 110 sends a count corresponding to the desired orthogonal travel of carriage 4 to a command register. An electronic counter counts the apertures passed over by the format strip 8 apparatus as the carriage moves, and a comparator, also provided with the desired count, stops the output driving signal from saturated amplifier 112 one count short of the desired number. The servo action of the system shown in FIG. 4 then accurately moves the carriage to the final desired position.

A binary-coded-decimal mode may also be used to establish the desired count, in which case multiple conductors in parallel are provided between the HOST COM and the command register.

Throughout this specification specific structure, proportions, circuit component values, and details have been given to most clearly and succintly teach the invention. Nominal equivalents and variations thereof are also within the scope of the invention.

We claim:
1. A microfiche camera comprising;
   a. a stationary image-forming lens (2),
   b. a carriage (4) carrying only a portion of a film strip (22) that is longitudinally movable therethrough and selectively positionable to receive an image from said lens,
   c. means (12, 14) to translate said carriage orthogonally with respect to the length of said film strip,
   d. microfiche-spacing format means (8) disposed upon said carriage,
   e. motion-producing and responsive means (11, 102) controlable by said format means and connected to said means to translate said carriage for positioning said carriage, and
   f. stationary guide means (32, 33, 33') bearing upon that portion of said film strip adjacent to said carriage
   to guide said film strip with respect to the longitudinal and the orthogonal motion of said carriage.
2. The camera of claim 1 in which said stationary guide means includes;
   a. a portion (32) of said guide means narrower than said film strip and bearing upon it before and after it moves through said carriage, and
   b. a transverse guide (33, 33') wider than said film strip and bearing upon it before it moves through said carriage.
3. The camera of claim 2 in which;
   a. the width of said narrow portion of said guide means is of the order of one-sixth of the width of said film strip.
4. The camera of claim 1 in which said stationary guide means includes;
   a. a single pocket substantially rectilinear (32) for containing both supply and takeup loops of said film, said single pocket positioned adjacent to said carriage.

5. The camera of claim 4 which additionally includes;
  a. film strip supply means (27),
  b. film strip take-up means (73),
  c. a first film-loop-actuated switch (30) in said single pocket, positioned to actuate said supply means to provide a loop of given size before said film strip moves into said carriage, and
  d. a second film-loop-actuated switch (60) in said single pocket, positioned to actuate said take-up means to provide a loop of different size than said given size after said film strip moves out of said carriage.

6. The camera of claim 5 in which;
  a. said loop of given size is relatively large with respect to said loop of different size, to accomplish titling.

7. The camera of claim 1, which additionally includes;
  a. valve means (103) pneumatically connected to said carriage to selectively apply vacuum or fluid pressure to said carriage adjacent to said film strip,
  b. longitudinal film strip pull-down means (16),
  c. electrical control means (144, 148) connected to said valve means and operable in synchronism with said pull-down means to;
    1. draw said film strip to said carriage by vacuum when said film strip is stationary with respect to said carriage, and
    2. separate said film from said carriage by pressure when said film strip is moving with respect to said carriage.

8. The camera of claim 2 in which said stationary guide means additionally includes;
  a. a film strip guide (41) narrower than said film strip, surmounting the narrow portion of said guide means (32)
  and having a forward and downwardly extending shape to guide said film onto said carriage.

9. The camera of claim 2 which additionally includes;
  a. plural lateral guides (88, 91) which selectively laterally constrain a narrow film strip within the narrow portion of said guide means (32), and
  b. means (87, 89, 92) to selectively insert said lateral guides into the film path
  for the selective transport of narrow film.

10. The camera of claim 7 in which;
  a. said carriage (4) includes a flat platen (48) having separate operative sections of plural widths
  to selectively draw to and separate from said platen film strips (22) of corresponding plural widths.

11. The camera of claim 1 in which;
  a. said carriage (4) includes a flat platen (48),
  b. the surface of said platen includes plural grooves (52) in a recurrent diamond pattern, and
  c. holes (53) at each intersection of said grooves for selectively conveying vacuum or fluid pressure.

12. The camera of claim 1 in which said motional means (11, 102) is a servo system including;
  a. command means (110) to originate a saturated signal for accelerating said carriage orthogonally,
  b. a comparator (118) connected to said command means and controlable by said format means (8), to inaugurate deceleration of said carriage subsequent to said accelerating, and
  c. a carriage-motion-detector (126) connected to said comparator and to said command means
  to inhibit exposure of said film strip (22) when said carriage is in motion.

13. The camera of claim 1 in which said motional means (11, 102) is a stepper motor system including;
  a. a driving pulse clock (193),
  b. command means (110'),
  c. a comparator (118) connected to said command means and controlable by the format means (8'), and
  d. electrical gating means (194 & 195) connected to said clock and to said command means
  to drive the stepper means (190).

14. The camera of claim 1 in which means to longitudinally move said film strip (22) includes;
  a. a stepper device (16),
  b. electrical command means (110),
  c. electrical gate means (153, 154) connected to said command means and to said stepper device for the control of said stepper device, and
  d. mechanical means (18), connected to said stepper device and bearing upon said film strip
  for accomplishing longitudinal motion of said film strip.

15. The camera of claim 1 which additionally includes;
  a. an electric generator (120), to produce an output when said carriage is moving orthogonally, and
  b. plural networks (166–170 & 167–170') connected to said generator to produce a unidirectional electrical output therefrom
  that is independent of the direction of the orthogonal motion.

16. The camera of claim 15 in which;
  a. the plurality of said networks is two,
  b. each of said networks includes a Zener diode (166, 167), and
  c. the polarity of connection of the Zener diodes is opposite in each network.

* * * * *